United States Patent
Buesing

(10) Patent No.: US 10,330,148 B2
(45) Date of Patent: Jun. 25, 2019

(54) BEARING ARRANGEMENT WITH A FIRST BEARING LAYER AND A SECOND BEARING LAYER

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 675 days.

(21) Appl. No.: 14/630,753

(22) Filed: Feb. 25, 2015

(65) Prior Publication Data

US 2015/0240868 A1    Aug. 27, 2015

(30) Foreign Application Priority Data

Feb. 26, 2014    (EP) .................................. 14400013

(51) Int. Cl.
*F16C 27/02* (2006.01)
*F16C 27/06* (2006.01)
(Continued)

(52) U.S. Cl.
CPC ............ *F16C 27/063* (2013.01); *B64C 27/35* (2013.01); *F16C 11/04* (2013.01); *F16C 17/18* (2013.01);
(Continued)

(58) Field of Classification Search
CPC ........ F16C 27/063; F16C 27/35; F16C 17/18; F16C 33/203; F16C 1/40
See application file for complete search history.

(56) References Cited

U.S. PATENT DOCUMENTS

| 2,958,563 | A | 11/1960 | Alexandroff |
| 3,709,570 | A | 1/1973 | Galbato |
| | | (Continued) | |

FOREIGN PATENT DOCUMENTS

| CA | 2636221 | 12/2008 |
| CN | 2573752 | 9/2003 |
| | (Continued) | |

OTHER PUBLICATIONS

Extended European Search Report for EP 14400013.0, Completed by the European Patent Office, dated Aug. 20, 2014, 7 Pages.

*Primary Examiner* — Kayla McCaffrey
(74) *Attorney, Agent, or Firm* — Brooks Kushman P.C.

(57) ABSTRACT

A bearing arrangement with a first bearing layer comprising a first bearing support element and a second bearing layer comprising a second bearing support element, the first and second bearing layers being glidingly interconnected by at least one intermediate gliding element, wherein at least one first gliding surface is arranged between the first bearing support element and the at least one intermediate gliding element, and wherein at least one second gliding surface is arranged between the second bearing support member and the at least one intermediate gliding element, the at least one intermediate gliding element being elastically attached to the first bearing support element by means of at least one first flexible connector and to the second bearing support element by means of at least one second flexible connector.

20 Claims, 7 Drawing Sheets

(51) Int. Cl.
*F16C 33/20* (2006.01)
*B64C 27/35* (2006.01)
*F16C 11/04* (2006.01)
*F16C 17/18* (2006.01)
*F16C 29/02* (2006.01)
*F16F 1/40* (2006.01)

(52) U.S. Cl.
CPC ............ *F16C 29/02* (2013.01); *F16C 33/201* (2013.01); *F16C 33/203* (2013.01); *F16F 1/40* (2013.01); *F16C 2326/43* (2013.01)

(56) References Cited

U.S. PATENT DOCUMENTS

| | | | |
|---|---|---|---|
| 3,860,301 A | 1/1975 | Zerbola | |
| 3,862,812 A | 1/1975 | Gorndt et al. | |
| 3,924,907 A * | 12/1975 | Czernik | E01D 19/041 |
| | | | 14/73.5 |
| 3,950,964 A | 4/1976 | Alexeeva et al. | |
| 4,121,861 A | 10/1978 | Gorndt | |
| 4,133,587 A | 1/1979 | Kume | |
| 4,286,827 A * | 9/1981 | Peterson | F16C 27/063 |
| | | | 267/141.1 |
| 4,416,473 A | 11/1983 | Lamy et al. | |
| 4,432,668 A | 2/1984 | Rank | |
| 4,435,890 A | 3/1984 | Ernst et al. | |
| 4,664,539 A | 5/1987 | Li | |
| 5,031,545 A | 7/1991 | Bourgeot | |
| 5,338,055 A | 8/1994 | Mauz | |
| 5,601,408 A | 2/1997 | Hunter et al. | |
| 6,523,708 B2 | 2/2003 | Weckbecker | |
| 6,726,394 B2 | 4/2004 | Garnier et al. | |
| 6,803,095 B1 * | 10/2004 | Halladay | B32B 5/08 |
| | | | 384/221 |
| 7,703,427 B2 | 4/2010 | Schafer et al. | |
| 8,330,666 B2 | 12/2012 | Tsou et al. | |
| 8,764,300 B2 | 7/2014 | Errard et al. | |
| 2004/0184869 A1 | 9/2004 | Garnier et al. | |
| 2005/0001366 A1 | 1/2005 | Hederstierna | |
| 2005/0200064 A1 | 9/2005 | Klein et al. | |
| 2009/0010586 A1 | 1/2009 | Mock et al. | |
| 2009/0212558 A1 | 8/2009 | Gutierrez-Lemini et al. | |
| 2011/0206303 A1 | 8/2011 | James | |
| 2011/0222807 A1 | 9/2011 | Tanoue et al. | |

FOREIGN PATENT DOCUMENTS

| | | |
|---|---|---|
| CN | 200989377 | 12/2007 |
| CN | 201412443 | 2/2010 |
| CN | 201606408 | 10/2010 |
| CN | 101908668 | 12/2010 |
| CN | 2677102 | 1/2011 |
| CN | 202468702 | 10/2012 |
| CN | 102852975 | 1/2013 |
| CN | 202833642 | 3/2013 |
| DE | 729032 | 12/1942 |
| DE | 870047 | 3/1953 |
| DE | 49729 | 8/1966 |
| DE | 2155048 | 7/1972 |
| DE | 2520947 | 12/1975 |
| DE | 2726914 | 12/1977 |
| DE | 2639893 | 3/1978 |
| DE | 3132711 | 12/1982 |
| DE | 4112253 | 10/1992 |
| DE | 4138609 | 5/1993 |
| DE | 10039573 | 1/2002 |
| DE | 10314259 | 10/2004 |
| DE | 20316009 | 3/2005 |
| DE | 102004014775 | 11/2005 |
| DE | 102005027503 | 12/2006 |
| DE | 102006004297 | 8/2007 |
| DE | 102006051643 | 5/2008 |
| DE | 102007062290 | 6/2009 |
| DE | 102008049813 | 4/2010 |
| DE | 102009022206 | 12/2010 |
| DE | 102010012474 | 9/2011 |
| DE | 102011001902 | 5/2012 |
| DE | 102011077814 | 12/2012 |
| DE | 102011077816 | 12/2012 |
| EP | 0456384 | 11/1991 |
| EP | 1199483 | 4/2002 |
| EP | 1384915 | 1/2004 |
| EP | 1605173 | 12/2005 |
| EP | 2503164 | 9/2012 |
| FR | 2642121 | 7/1990 |
| FR | 2663090 | 12/1991 |
| FR | 2910090 | 6/2008 |
| GB | 2094393 | 9/1982 |
| HU | 210947 | 9/1995 |
| IT | 964486 | 1/1974 |
| IT | 1151323 | 12/1986 |
| IT | MI20040569 | 6/2004 |
| IT | RM20090222 | 2/2010 |
| JP | 028512 | 1/1990 |
| JP | 2000027857 | 1/2000 |
| JP | 2007069820 | 3/2007 |
| NO | 8102321 | 1/1982 |
| RU | 2224146 | 2/2004 |
| RU | 2005119120 | 1/2006 |
| RU | 2010127030 | 1/2012 |
| SE | 0200617 | 8/2003 |
| WO | 2004002762 | 1/2004 |
| WO | 2006045389 | 5/2006 |
| WO | 2008047046 | 4/2008 |
| WO | 2009108644 | 9/2009 |
| WO | 2010037476 | 4/2010 |
| WO | 2010128378 | 11/2010 |
| WO | 2011008704 | 1/2011 |
| WO | 2011062257 | 5/2011 |

* cited by examiner

BEARING ARRANGEMENT WITH A FIRST BEARING LAYER AND A SECOND BEARING LAYER

CROSS REFERENCE TO RELATED APPLICATION

This application claims priority to European patent application No. EP 14 400013.0, filed Feb. 26, 2014, the disclosure of which is incorporated in its entirety by reference herein.

BACKGROUND OF THE INVENTION (1) Field of the Invention

The invention is related to a bearing arrangement with at least one first bearing layer and at least one second bearing layer, said bearing arrangement comprising the features of claim 1.

(2) Description of Related Art

Generally, bearing arrangements with at least one first bearing layer and at least one second bearing layer can be classified broadly with respect to their allowed motions. Accordingly, four broad bearing arrangement categories can be defined, i.e. hinge motion bearing arrangements that are configured to allow hinge motion, spherical bearing arrangements that are configured to allow spherical rotation, radial bearing arrangements that are configured to allow axial rotation and translational bearing arrangements that are configured to allow linear motion.

Hinge motion bearing arrangements are well-known by the skilled person and, for instance, used in doors, windows and the like. However, such hinge motion bearing arrangements are irrelevant to the present application, so that a detailed description thereof can be omitted for brevity and conciseness.

Spherical bearing arrangements are also well-known by the skilled person and, for instance, described in the documents CN 202 833 642 U, US 2011/0206303 A1, WO 2011/008704 A1, IT RM2009/0222 A1, WO 2010/037476 A2, WO 2009/108644 A1, US 2009/0212558 A1, JP 2007/069820 A, EP 1 605 173 A1, CN 2 677 102 U, US 2004/0184869 A1, EP 1 199 483 A1, U.S. Pat. No. 5,601,408 A, DE 41 38 609 A1, HU 9 104 038 D0, FR 2 642 121 A1, DE 31 32 711 01, U.S. Pat. No. 8,102,321 A, U.S. Pat. No. 4,121,861 A and DE 25 20 947 A1. Therefore, a more detailed description of such spherical bearing arrangements is omitted hereinafter for brevity and conciseness.

Radial bearing arrangements are also well-known by the skilled person and, for instance, described in the documents CN 102 852 975 A, DE 10 2011 077816 A1, DE 10 2011 077814 A1, CN 202 468 702 U, EP 2 503 164 A1, DE 10 2011 001902 A1, RU 2010/127030 A, DE 10 2010 012474 A1, WO 2011/062257 A1, DE 10 2009 022206 B3, CN 201 606 408 U, DE 10 2008 049813 A1, CN 201 412 443 U, DE 10 2007 062290 A1, CA 2 636 221 A1, CN 200 989 377 U, FR 2 910 090 A1, DE 10 2006 051643 A1, WO 2008/047046 A1, DE 10 2006 004297 A1, RU 2005/119120 A, DE 10 2005 027503 A1, WO 2006/045389 A1, DE 10 2004 014775 A1, DE 20 316 009 U1, IT MI2004/0569 A1, CN 2 573 752 U, WO 2004/002762 A1, SE 2002/00617 D0, RU 2 224 146 02, DE 100 39 573 01, JP 2000/027857 A, DE 41 12 253 A1, FR 2 663 090 A1, JP H028512 A, U.S. Pat. No. 4,664,539 A, IT 8 220 932 D0, DE 26 39 893 A1, DE 27 26 914 A1, U.S. Pat. No. 3,950,964 A, IT 964 486 B, DE 21 55 048 A1, U.S. Pat. No. 2,958,563 A, DE 870 047 0, DE 729 032 C and DD 49729 A. Therefore, a more detailed description of such bearing arrangements is also omitted hereinafter for brevity and conciseness.

An exemplary translational bearing arrangement is described in the document CN 101 908 668 U. This translational bearing arrangement is embodied in the form of a multi-layer bearing with plural bearing layers and comprises an outer bearing ring, an inner bearing ring, multi-layer sliding modules which are evenly arranged in an annular space between the outer bearing ring and the inner bearing ring, as well as constraint mechanisms which are arranged at both ends or suitable intermediate positions of the multi-layer sliding modules. The constraint mechanisms are used for constraining the multi-layer sliding modules and are arranged in the constraint mechanisms. More specifically, the constraint mechanisms are implemented by reset springs or diaphragms that are used at each end of the multi-layer bearing in order to retain associated sliding rails that define the multi-layer sliding modules. Using this arrangement, the sliding rail of the inner bearing ring can be moved with a higher distance than the sliding rail of the outer bearing ring, as the moment caused by the reset spring or diaphragm decreases towards the inner bearing ring.

In all of the above-described bearing arrangements, associated bearing layers are provided that are configured to enable a relative movement between corresponding bearing support elements by means of associated bearing means. Such movements are characterized by the relative speed between the associated bearing layers or bearing layer components, which determines, at least to some extent, the durability of the underlying bearing arrangements. Furthermore, there are application-specific maximum values for the relative velocities between the bearing means and the bearing support elements, which limit e.g. the selection of applicable bearing means and their dimensions in comparatively high loaded bearing arrangements.

More specifically, in a bearing arrangement with a single bearing layer or plural bearing layers that are arranged in parallel, corresponding bearing support elements that are usually implemented as bearing rings are movable relative to each other by associated bearing means. However, the relative speed which is realizable with such bearing layers depends, for a given angular rotation rate and amplitude, on the diameter of the bearing rings, so that a maximum rotational speed of the bearing arrangement is limited by a maximum diameter of its bearing rings. This limits a frequently desired high shaft diameter in lightweight designs.

Especially, with so-called low-maintenance and maintenance-free bearing arrangements, an underlying durability is proportional to the product of surface pressure and relative velocity (P×V) between the bearing rings. Therefore, service life duration can only be modified by varying an underlying width of such bearing arrangements, as the value of this product (P×V) is independent from a respectively given diameter of the bearing rings. However, the width of the bearing arrangement cannot be sized arbitrarily. Therefore, at comparatively high loads, high angular frequencies and amplitudes, the application of low-maintenance or maintenance-free bearing arrangements is not possible.

Furthermore, concentrically arranged bearing arrangements are usually not used to provide redundancy, since associated resistors, e.g. friction, of the bearing arrangements usually always vary in their respective realization and are, thus, hardly dependent on the realizable relative speed. Accordingly, associated bearing support elements with the lowest resistances move with the highest relative speed and all other bearing support elements move with a much lower relative speed, or remain static. Such relative velocities are, however, not defined.

Moreover, elastomeric bearing arrangements usually comprise concentrically arranged elastomeric layers which are separated by rigid intermediate layers, e.g. steel. These intermediate layers support the elastomeric layers, which would otherwise be squeezed out laterally because of an underlying, relatively high transverse contraction occurring at comparatively high loads, and the bearing arrangement would, thus, fail. The number of elastomeric layers is based on a given load and total thickness of the elastomeric layers, and not on the rotational angle frequency.

However, elastomeric bearings generally have a limited storage time, a relatively high mass and high dispersion of quality and durability. Furthermore, the maximum rotation angle depends on the total thickness of the elastomeric layers and a given yield point of a respectively applied elastomer. Since the applied elastomer is simultaneously subjected to compressive stresses and shear stresses, it cannot be optimized for only one given type of load, but it needs at least to represent an acceptable compromise for both types of loads.

BRIEF SUMMARY OF THE INVENTION

It is, therefore, an object of the present invention to provide a bearing arrangement with at least one first bearing layer and at least one second bearing layer having an increased durability, stability and robustness.

This object is solved by a bearing arrangement with at least one first bearing layer and at least one second bearing layer with the features of claim 1.

More specifically, according to the invention a bearing arrangement comprises at least one first bearing layer comprising at least one first bearing support element and at least one second bearing layer comprising at least one second bearing support element. Said at least one first and second bearing layers are glidingly interconnected by at least one intermediate gliding element, wherein at least one first gliding surface is arranged between said at least one first bearing support element and said at least one intermediate gliding element, and wherein at least one second gliding surface is arranged between said at least one second bearing support member and said at least one intermediate gliding element. Said at least one intermediate gliding element is elastically attached to said at least one first bearing support element by means of at least one first flexible connector and to said at least one second bearing support element by means of at least one second flexible connector.

By glidingly interconnecting said at least one first bearing support element and said at least one second bearing support element using said at least one intermediate gliding element, at least two bearing layers can be arranged in series. More specifically, by glidingly interconnecting a single first bearing support element and a single second bearing support element using a single intermediate gliding element, a first and a second bearing layer are arranged in series. However, by glidingly interconnecting said single first bearing support element and said single second bearing support element using a number of N intermediate gliding elements, a number of N+1 bearing layers can be arranged in series. If, furthermore, a number of M first and second bearing support elements is glidingly interconnected using said number N of intermediate gliding elements, a number of M bearing stages that are arranged in parallel, each bearing stage having a number of N+1 serial bearing layers can be provided.

Preferably, a multiplicity of bearing layers is arranged in series. For cylindrical or spherical bearing arrangements, this can be achieved by a concentric arrangement of the respective bearing layers and in translational bearing arrangements this can be achieved by a layered arrangement. The overall relative speed occurring between these serial bearing layers is distributed to the corresponding bearing support elements, intermediate gliding elements, gliding surfaces and flexible connectors, which are respectively arranged in series, whereby the distribution of the overall relative speed is performed by the flexible connectors provided in each bearing layer, so that a constant speed distribution over all serial bearing layers can be achieved.

Advantageously, a total relative velocity of the individual bearing layers mounted to each other in series is increased and can even exceed a corresponding maximum relative velocity of a single bearing layer. This allows larger shaft or joint diameter of the inner parts of the inventive bearing arrangement, i.e. the intermediate gliding elements, gliding surfaces and flexible connectors. It further allows higher angular frequencies, or shift speeds, of the bearing arrangement components.

Preferably, the inventive bearing arrangement comprises mechanical or elastomeric springs that embody the flexible connectors. When using elastomeric springs, they can be designed smaller than the conventionally used springs, as they are preferentially embodied to carry, at least substantially, shear loads generated by the movement of the bearing layers relative to each other instead of pressure loads. Such pressure loads are advantageously distributed to the gliding surfaces.

Furthermore, compared with conventional bearing arrangements, the relative speed of the individual serial bearing layers of the inventive bearing arrangement will be less than for a single stock, at the same loads, rotation frequencies angle amplitudes and similar dimensions. However, as the durability of a comparatively great number of bearing arrangements is a function of the relative speed between the bearing layers or bearing layer components, the durability of the bearing arrangement as a whole can be increased by this reduction in relative speed.

Moreover, if one of the serial bearing layers blocks in operation, e.g. seizes up, the remaining serial bearing layers of the inventive bearing arrangement advantageously still allow movement. Together with the increased total relative velocity of the individual bearing layers mounted to each other in series and a reduced maximum feasible angular amplitude of each individual bearing layer, this considerably increases safety of the inventive bearing arrangement.

When using mechanical springs, a more compact and lighter design can be enabled, as by larger angular amplitudes the whole thickness of an elastomeric spring would be very high in order to keep the shear strain within the permissible range. Furthermore, the remaining components of each serial bearing layer could be sized independently of the mechanical springs and use of materials with comparatively larger durability and storage times compared to elastomeric material is possible. Moreover, even if an elastomeric material is chosen as the material of the mechanical spring, then this elastic spring is not loaded by the primary bearing loads, but must be interpreted only as a mechanical spring so that the compressive strength plays a subordinate role.

According to a preferred embodiment, said at least one first flexible connector and/or said at least one second flexible connector comprise at least one elastomeric spring and/or at least one mechanical spring.

According to a further preferred embodiment, said at least one first flexible connector and/or said at least one second flexible connector are relaxed in an unloaded state of said at least one first and second bearing layers.

According to a further preferred embodiment, said at least one first and second flexible connectors are at least substantially designed for carrying shear loads.

According to a further preferred embodiment, said at least one first and second bearing layers define cylindrical or spherical bearings with limited angular amplitude.

According to a further preferred embodiment, said at least one first and second flexible connectors generate a restoring force when said at least one first and second bearing layers are in a loaded state, said restoring force comprising a magnitude that increases with a current angular amplitude associated with a corresponding one of said at least one first and second bearing layers.

According to a further preferred embodiment, said at least one first and second bearing support elements and said at least one intermediate gliding element define shell-type bushings.

According to a further preferred embodiment, said at least one first and second bearing layers define linear bearings with limited linear displacement.

According to a further preferred embodiment, said at least one first and second flexible connectors generate a restoring force when said at least one first and second bearing layers are in a loaded state, said restoring force comprising a magnitude that increases with a current linear displacement associated with a corresponding one of said at least one first and second bearing layers.

According to a further preferred embodiment, said at least one first gliding surface and/or said at least one second gliding surface is formed by a polytetrafluoroethylene gliding component.

The present invention further provides a multi-blade rotor comprising a multiplicity of rotor blades and a rotor head with an associated rotor hub, wherein at least one of said multiplicity of rotor blades is connected with said rotor hub by means of a bearing arrangement with at least one first bearing layer comprising at least one first bearing support element and at least one second bearing layer comprising at least one second bearing support element. Said at least one first and second bearing layers are glidingly interconnected by at least one intermediate gliding element, wherein at least one first gliding surface is arranged between said at least one first bearing support element and said at least one intermediate gliding element, and wherein at least one second gliding surface is arranged between said at least one second bearing support member and said at least one intermediate gliding element. Said at least one intermediate gliding element is elastically attached to said at least one first bearing support element by means of at least one first flexible connector and to said at least one second bearing support element by means of at least one second flexible connector.

Thus, the present invention allows an advantageous application of the inventive bearing arrangement with a multi-blade rotor in order to connect one or more rotor blades of said multi-blade rotor to an associated rotor hub.

According to a further preferred embodiment, said at least one first flexible connector and/or said at least one second flexible connector comprise at least one elastomeric spring and/or at least one mechanical spring.

According to a further preferred embodiment, said at least one first flexible connector and/or said at least one second flexible connector are relaxed in an unloaded state of said at least one first and second bearing layers.

According to a further preferred embodiment, said at least one first and second flexible connectors are at least substantially designed for carrying shear loads.

According to a further preferred embodiment, said at least one first and second bearing layers define cylindrical or spherical bearings with limited angular amplitude.

According to a further preferred embodiment, said at least one first and second flexible connectors generate a restoring force when said at least one first and second bearing layers are in a loaded state, said restoring force comprising a magnitude that increases with a current angular amplitude associated with a corresponding one of said at least one first and second bearing layers.

According to a further preferred embodiment, said at least one first and second bearing support elements and said at least one intermediate gliding element define shell-type bushings.

According to a further preferred embodiment, said at least one of said multiplicity of rotor blades comprises a coupling sleeve that forms said at least one first bearing support element and said rotor hub forms said at least one second bearing support element.

According to a further preferred embodiment, said at least one first gliding surface and/or said at least one second gliding surface is formed by a polytetrafluoroethylene gliding component.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
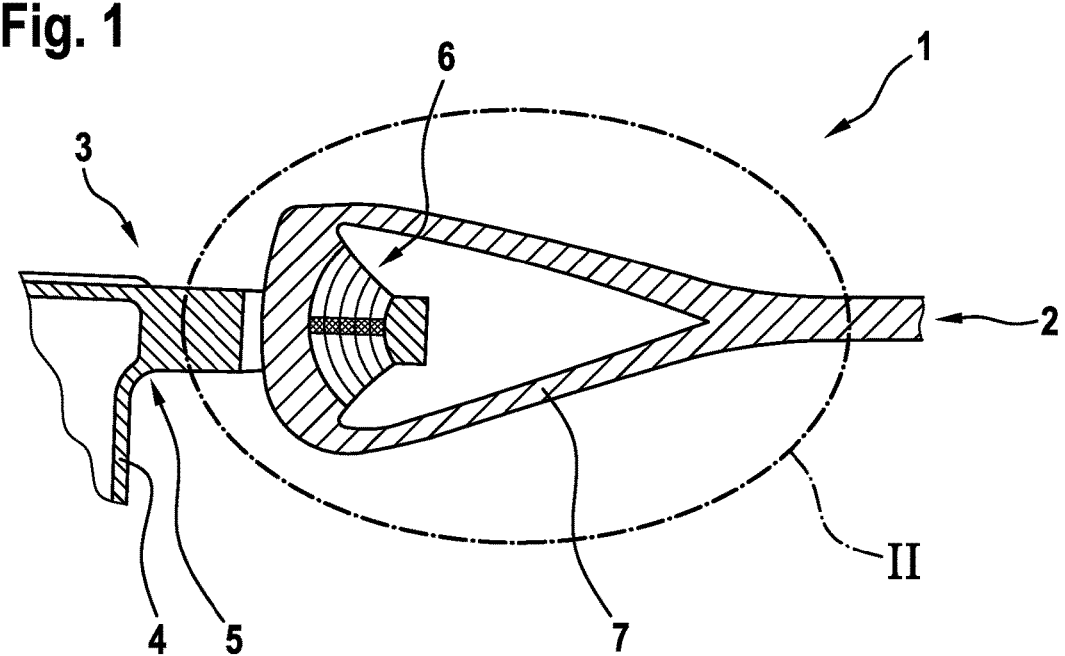
FIG. 1 shows a cross section of a multi-blade rotor having a bearing arrangement according to a first embodiment of the invention.

FIG. 1 shows a multi-blade rotor 1 of a rotary wing aircraft, in particular a multi-blade rotor for a main rotor of a helicopter, which is illustratively embodied as a fully articulated rotor similar to a STARFLEX rotor. The multi-blade rotor 1 preferably comprises a multiplicity of rotor blades 2 and a rotor head 3 with an associated rotor hub 5, which is preferentially integral to an associated rotor mast 4. It should, however, be noted that the multiplicity of rotor blades 2 is not shown in greater detail, neither in FIG. 1 nor in the remaining figures, for simplicity and clarity of the drawings.

At least one of the multiplicity of rotor blades 2 is connected with the rotor hub 5 by means of a bearing arrangement 6 according to a first embodiment, which is preferably embodied as a spherical bearing arrangement with limited angular amplitude. Preferably, the at least one of the multiplicity of rotor blades 2 comprises a coupling sleeve 7 that is connected with the rotor hub 5 by means of the spherical bearing arrangement 6.

Figure 2:
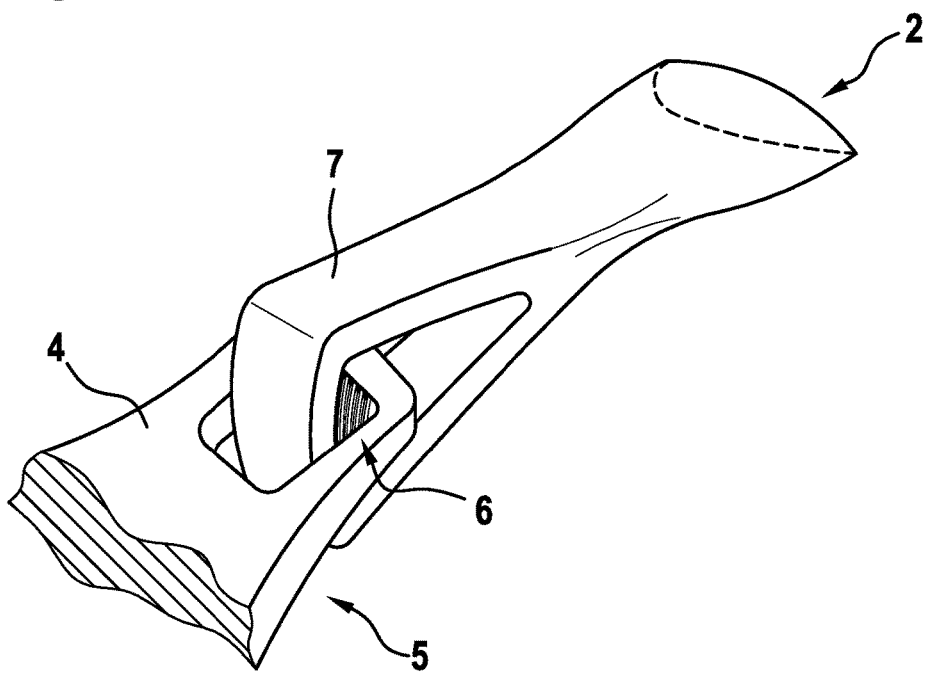
FIG. 2 shows a perspective cutout of the multi-blade rotor of FIG. 1.

FIG. 2 shows a cutout of the at least one of the multiplicity of rotor blades 2 and the rotor mast 4 with the rotor hub 5 of FIG. 1, to further illustrate the positioning of the spherical bearing arrangement 6 in a region between the coupling sleeve 7 of the at least one of the multiplicity of rotor blades 2 and the rotor hub 5. The spherical bearing arrangement 6 is preferably embodied to allow spherical motion for flap, pitch and drag hinging of the at least one of the multiplicity of rotor blades 2 relative to the rotor hub 5.

Figure 3:
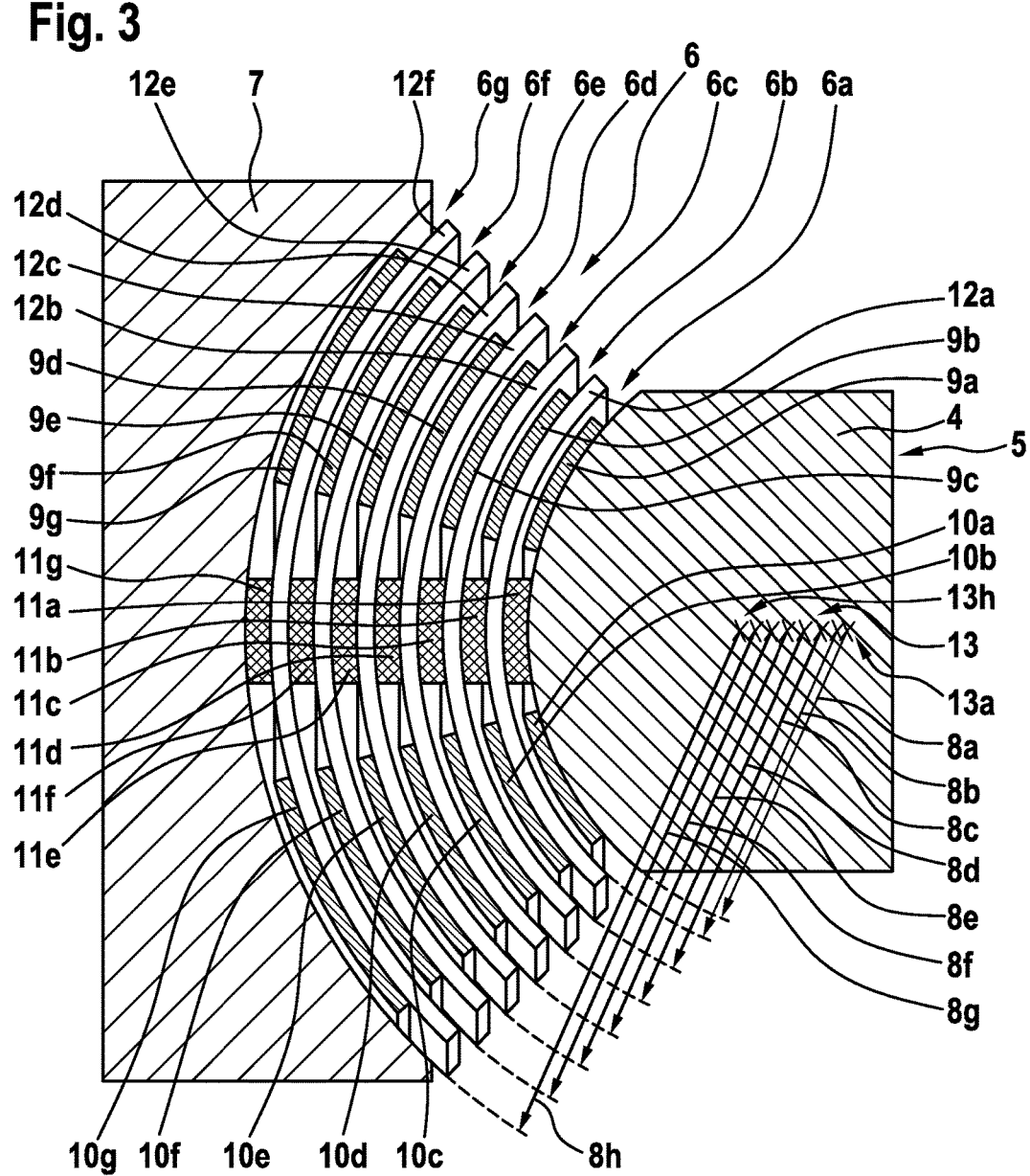
FIG. 3 shows an enlarged cross section of the bearing arrangement of FIG. 1.

FIG. 3 shows the spherical bearing arrangement 6 of FIG. 1 and FIG. 2, which is embodied according to the first embodiment and connects the rotor hub 5 to the coupling sleeve 7 of FIG. 1 and FIG. 2. More specifically, according to this first embodiment the spherical bearing arrangement 6 comprises at least one first bearing layer with at least one first bearing support element and at least one second bearing layer with at least one second bearing support element. By way of example, the spherical bearing arrangement 6 comprises a single first bearing layer 6a with a single first bearing support element, which is embodied by the rotor hub 5, and a single second bearing layer 6g with a single second bearing support element, which is embodied by the coupling sleeve 7.

It should be noted that provision of more than one first bearing layer and more than one second bearing layer allows arranging these bearing layers in parallel. Thus, a parallel bearing arrangement can be provided.

The coupling sleeve 7 and the rotor hub 5 illustratively comprise, in the region of the spherical bearing arrangement 6, a shell-type or spherical shape and are preferably glidingly interconnected by at least one intermediate gliding element. Preferably, the coupling sleeve 7 and the rotor hub 5 are glidingly interconnected by a multiplicity of intermediate gliding elements, such that a multiplicity of serially arranged bearing layers is provided between the coupling sleeve 7 and the rotor hub 5, as described in more detail below. By way of example, six intermediate gliding elements 12a, 12b, 12c, 12d, 12e, 12f are provided, which are illustratively embodied and hereinafter referred to as shell-type or spherical bushings.

Between the coupling sleeve 7 and the spherical bushing 12a, at least one first gliding surface is arranged. Illustratively, two first gliding surfaces 9a, 10a are arranged between the coupling sleeve 7 and the spherical bushing 12a. The two first gliding surfaces 9a, 10a are preferably glued or bonded to the coupling sleeve 7 and define an integral spherical gliding component having a first inner opening. However, the two first gliding surfaces 9a, 10a can also be embodied as two separate components and even more than two such components can be provided.

Similarly, between the rotor hub 5 and the spherical bushing 12f, at least one second gliding surface is arranged. Illustratively, two second gliding surfaces 9g, 10g are arranged between the rotor hub 5 and the spherical bushing 12f. The two second gliding surfaces 9g, 10g are preferably glued or bonded to the spherical bushing 12f and define an integral spherical gliding component having a second inner opening. However, the two second gliding surfaces 9g, 10g can also be embodied as two separate components and even more than two such components can be provided.

Illustratively, corresponding intermediate gliding surfaces are respectively arranged between each two adjacent spherical bushings and glued or bonded to one of them, as illustrated. In other words, intermediate gliding surfaces 9b, 10b are arranged between the spherical bushings 12a, 12b, intermediate gliding surfaces 9c, 10c are arranged between the spherical bushings 12b, 12c, intermediate gliding surfaces 9d, 10d are arranged between the spherical bushings 12c, 12d, intermediate gliding surfaces 9e, 10e are arranged between the spherical bushings 12d, 12e and intermediate gliding surfaces 9f, 10f are arranged between the spherical bushings 12e, 12f. Each such two second gliding surfaces 9b, 10b, 9c, 10c, 9d, 10d, 9e, 10e and 9f, 10f preferentially respectively define an integral spherical gliding component with an associated inner opening, but may, however, also be embodied as two or more separate components. The inner openings of the gliding surfaces 9a, 10a, 9b, 10b, 9c, 10c, 9d, 10d, 9e, 10e, 9f, 10f, 9g, 10g are preferably configured to receive associated flexible connectors 11a, 11b, 11c, 11d, 11e, 11f, 11g.

According to one aspect, each one of the gliding surfaces 9a, 10a, 9b, 10b, 9c, 10c, 9d, 10d, 9e, 10e, 9f, 10f, 9g, 10g has a spherical or at least curved shape and is rigidly attached either to the rotor hub 5 or to the coupling sleeve 7, or to an associated spherical bushing of the spherical bushings 12a, 12b, 12c, 12d, 12e, 12f. Illustratively, the gliding surfaces 9a, 10a are rigidly attached to the rotor hub 5 and the gliding surfaces 9b, 10b, 9c, 10c, 9d, 10d, 9e, 10e, 9f, 10f, 9g, 10g are respectively rigidly attached to the spherical bushings 12a, 12b, 12c, 12d, 12e, 12f.

The gliding surfaces 9a, 10a, 9b, 10b, 9c, 10c, 9d, 10d, 9e, 10e, 9f, 10f, 9g, 10g define the number of bearing layers that are embodied between the rotor hub 5 and the coupling sleeve 7 using the spherical bushings 12a, 12b, 12c, 12d, 12e, 12f. Accordingly, seven serially arranged bearing layers 6a, 6b, 6c, 6d, 6e, 6f, 6g are embodied between the coupling sleeve 7 and the rotor hub 5.

Preferably, the spherical bushing 12a is elastically attached to the rotor hub 5 by means of at least one first flexible connector, illustratively the flexible connector 11a, and the spherical bushing 12f is elastically attached to the coupling sleeve 7 by means of at least one second flexible connector, illustratively the flexible connector 11g. Furthermore, each two adjacent spherical bushings are respectively elastically attached to each other by means of an associated one of the flexible connectors 11b, 11c, 11d, 11e, 11f. Accordingly, the spherical bushings 12a, 12b are elastically attached to each other by the flexible connector 11b, the spherical bushings 12b, 12c are elastically attached to each other by the flexible connector 11c, the spherical bushings 12c, 12d are elastically attached to each other by the flexible connector 11d, the spherical bushings 12d, 12e are elastically attached to each other by the flexible connector 11e and the spherical bushings 12e, 12f are elastically attached to each other by the flexible connector 11f.

According to one aspect, the flexible connectors 11a, 11b, 11c, 11d, 11e, 11f, 11g interconnect the rotor hub 5, the coupling sleeve 7 and the spherical bushings 12a, 12b, 12c, 12d, 12e, 12f such that the gliding surfaces 9a, 10a, 9b, 10b, 9c, 10c, 9d, 10d, 9e, 10e, 9f, 10f, 9g, 10g are spaced from associated components, to which they are not rigidly attached, thereby defining associated gaps, as explained in more detail below with respect to FIG. 4. For instance, the gliding surfaces 9a, 10a are spaced from the spherical bushing 12a, the gliding surfaces 9b, 10b are spaced from the spherical bushing 12b, and so on.

The flexible connectors 11a, 11b, 11c, 11d, 11 e, 11f, 11g preferably comprise at least one elastomeric spring. They are preferentially configured to generate, in operation, a restoring force when the first and second bearing layers 6a, 6g are in a loaded state, said restoring force comprising a magnitude that increases with a current angular amplitude associated with a corresponding one of the first and second bearing layers 6a, 6g.

According to one aspect of the invention, each one of the flexible connectors 11a, 11b, 11c, 11d, 11 e, 11f, 11g is embodied using an elastomeric material. Furthermore, the flexible connectors 11a, 11b, 11c, 11d, 11 e, 11f, 11g are preferably glued or bonded to the rotor hub 5, the coupling sleeve 7 or the spherical bushings 12a, 12b, 12c, 12d, 12e, 12f, respectively, and at least substantially designed for carrying shear loads occurring in operation.

It should be noted that the flexible connectors 11a, 11b, 11c, 11d, 11 e, 11f, 11g generally need to be configured in order to allow displacement loads and, thus, a given limited angular displacement generated by relative movements occurring in the respective bearing layers 6a, 6b, 6c, 6d, 6e, 6f, 6g without failure. These displacement loads are, however, in the case of elastomeric springs the above mentioned shear loads.

Each one of the bearing layers 6a, 6b, 6c, 6d, 6e, 6f, 6g illustratively defines an individual spherical bearing that has associated inner and outer pivot centers and associated inner and outer bearing radii. The inner and outer bearing radii are referred to with the reference signs 8a, 8b, 8c, 8d, 8e, 8f, 8g, 8h, where 8a defines the inner bearing radius and 8b the outer bearing radius of the bearing layer 6a, and so on. The pivot centers are generally referred to with the reference sign 13 and only the inner pivot center of the bearing layer 6a and the outer pivot center of the bearing layer 6g are individually referred to with the reference signs 13a, 13h, for simplicity and clarity of the drawings. These pivot centers 13 are preferably offset in order to allow pretension of the flexible connectors 11a, 11b, 11c, 11d, 11 e, 11f, 11g under load, specifically in the case of elastomeric springs, in order to avoid failure or destruction of these elastomeric springs in operation.

According to one aspect, the bearing layers 6a, 6b, 6c, 6d, 6e, 6f, 6g are embodied as so-called self-lubricating bearings, in which the relative velocity and the surface speed have a particularly large impact on an underlying maximum capacity and durability. Therefore, at least one and, preferably, each one of the gliding surfaces 9a, 10a, 9b, 10b, 9c, 10c, 9d, 10d, 9e, 10e, 9f, 10f, 9g, 10g is formed by a polytetrafluoroethylene (PTFE) gliding component.

In operation of the multi-blade rotor 1 and, thus, the spherical bearing arrangement 6, the flexible connectors 11a, 11b, 11c, 11d, 11 e, 11f, 11 g are preferably relaxed in an unloaded state of their respective bearing layers 6a, 6b, 6c, 6d, 6e, 6f, 6g, and generate a restoring force when the bearing layers 6a, 6b, 6c, 6d, 6e, 6f, 6g are in a loaded state. This restoring force preferably comprises a magnitude that increases with a current angular amplitude associated with a corresponding one of the bearing layers 6a, 6b, 6c, 6d, 6e, 6f, 6g.

If the coupling sleeve 7, and thus the at least one of the multiplicity of rotor blades 2 of FIG. 1 and FIG. 2 is displaced relative to the rotor hub 5 with a given angular amplitude, the flexible connectors 11a, 11b, 11c, 11d, 11e, 11f, 11g are compressed until the gliding surfaces 9a, 10a, 9b, 10b, 9c, 10c, 9d, 10d, 9e, 10e, 9f, 10f, 9g, 10g contact the components to which they are not rigidly attached. For instance, the gliding surfaces 9a, 10a contact the spherical bushing 12a, the gliding surfaces 9b, 10b contact the spherical bushing 12b, and so on. In this configuration, all pivot centers 13 combine in a single pivot center.

Figure 4:
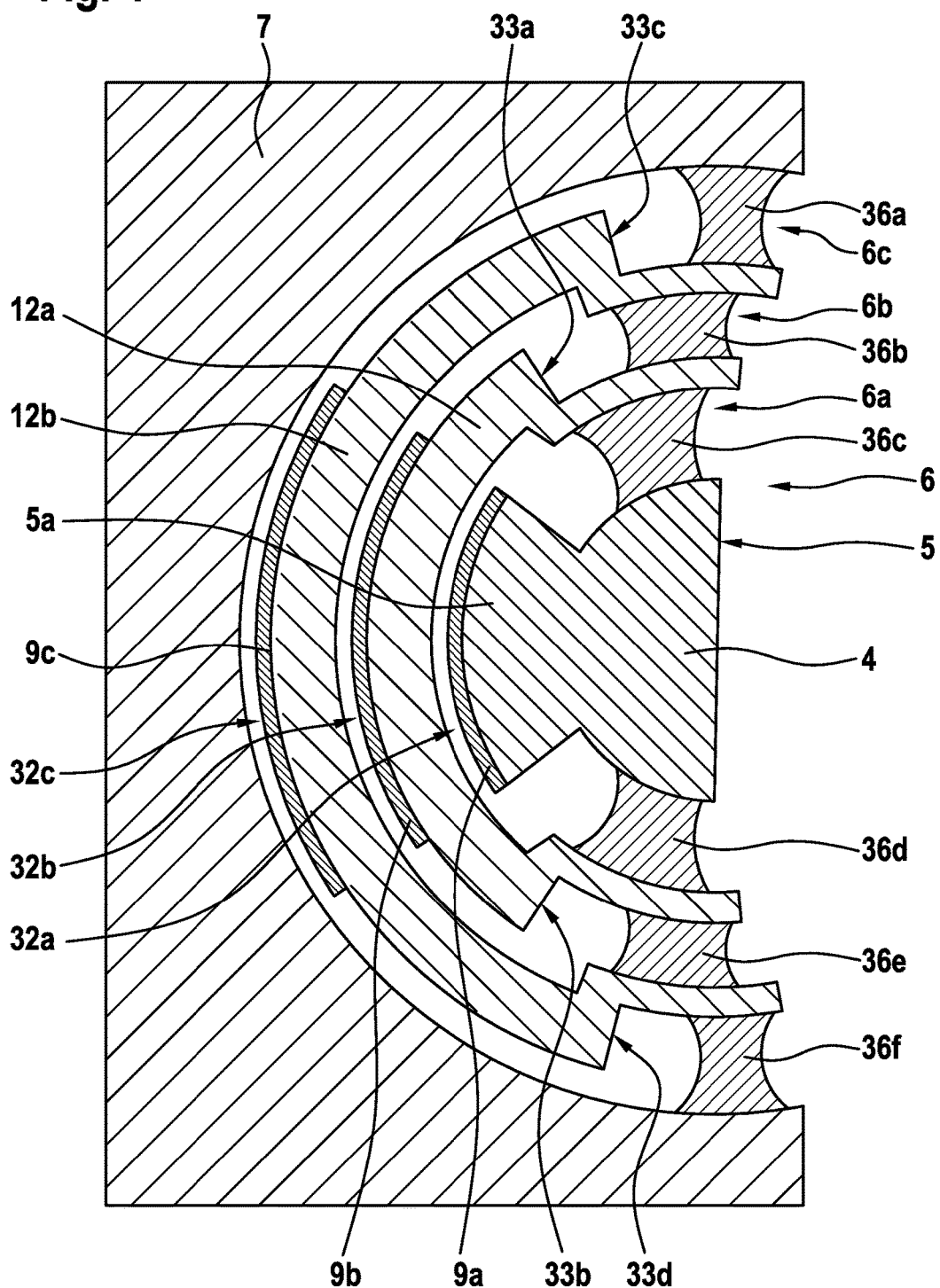
FIG. 4 shows the bearing arrangement of FIG. 3, which is configured according to a second embodiment.

FIG. 4 shows the spherical bearing arrangement 6 of FIG. 1 and FIG. 2 that connects the rotor hub 5 to the coupling sleeve 7 of FIG. 1 and FIG. 2, and which is embodied according to a second embodiment. More specifically, according to this second embodiment the spherical bearing arrangement 6 comprises only the three bearing layers 6a, 6b, 6c with the two spherical bushings 12a, 12b that are arranged in series.

In contrast to the first embodiment, each one of the spherical bushings 12a, 12b now comprises, at least in cross section, two shoulders 33a, 33b, 33c, 33d. More specifically, the spherical bushing 12a now comprises the two shoulders 33a, 33b, which preferably define a single ring shoulder that reduces a given radius of the spherical bushing 12a from a first to a second value. The spherical bushing 12b now comprises the two shoulders 33c, 33d, which preferably define a single ring shoulder that reduces a given radius of the spherical bushing 12b from a third value to a fourth value that preferably corresponds at least approximately to the first value. Furthermore, the rotor hub 5 now preferably comprises a specific bearing support element 5a, which is in cross section at least approximately dovetailed.

Moreover, according to the second embodiment, the bearing layers 6a, 6b, 6c now only comprise the gliding surfaces 9a, 9b, 9c, which are rigidly attached to the rotor hub 5 and the spherical bushings 12a, 12b, respectively. More specifically, the gliding surface 9a is preferably rigidly attached, e.g. by press-fitting, gluing or bonding, to the rotor hub 5 in the region of the specific bearing support element 5a, the gliding surface 9b is preferably rigidly attached, e.g. by press-fitting, gluing or bonding, to the spherical bushing 12a in the region having the given radius with the first value, and the gliding surface 9c is preferably rigidly attached, e.g. by press-fitting, gluing or bonding, to the spherical bushing 12b in the region having the given radius with the third value.

According to one aspect, the spherical bushing 12b is elastically attached to the coupling sleeve 7 by means of at least two flexible connectors 36a, 36f. These flexible connectors 36a, 36f are illustratively arranged in the region of the spherical bushing 12b having the given radius with the fourth value, such that a gap 32c is defined between the gliding surface 9c and the coupling sleeve 7. However, it should be noted that more than two flexible connectors can be applied and that the flexible connectors 36a, 36f may alternatively also embody an annular connector.

Preferably, the spherical bushing 12b is also elastically attached to the spherical bushing 12a by means of at least two flexible connectors 36b, 36e. These flexible connectors 36b, 36e are illustratively arranged in the region of the spherical bushing 12b having the given radius with the fourth value and in the region of the spherical bushing 12a having the given radius with the second value, such that a gap 32b is defined between the gliding surface 9b and the spherical bushing 12b. However, it should be noted that again more than two flexible connectors can be applied and that the flexible connectors 36b, 36e may alternatively also embody an annular connector.

Furthermore, the spherical bushing 12a is also elastically attached to the rotor hub 5 by means of at least two flexible connectors 36c, 36d. These flexible connectors 36c, 36d are illustratively arranged in the region of the spherical bushing 12a having the given radius with the second value, such that a gap 32a is defined between the gliding surface 9a and the spherical bushing 12a. However, it should be noted that again more than two flexible connectors can be applied and that the flexible connectors 36c, 36d may alternatively also embody an annular connector.

The flexible connectors 36a, 36b, 36c, 36d, 36e, 36f preferably comprise at least one elastomeric spring. According to one aspect of the invention, each one of the flexible connectors 36a, 36b, 36c, 36d, 36e, 36f is embodied using an elastomeric material. Furthermore, the flexible connectors 36a, 36b, 36c, 36d, 36e, 36f are preferably glued or bonded to the rotor hub 5, the coupling sleeve 7 or the spherical bushings 12a, 12b, respectively, and at least substantially designed for carrying shear loads occurring in operation.

The functioning of the spherical bearing arrangement 6 according to the second embodiment corresponds to the functioning of the spherical bearing arrangement according to the first embodiment, so that a detailed description thereof can be omitted for brevity and conciseness.

Figure 5:
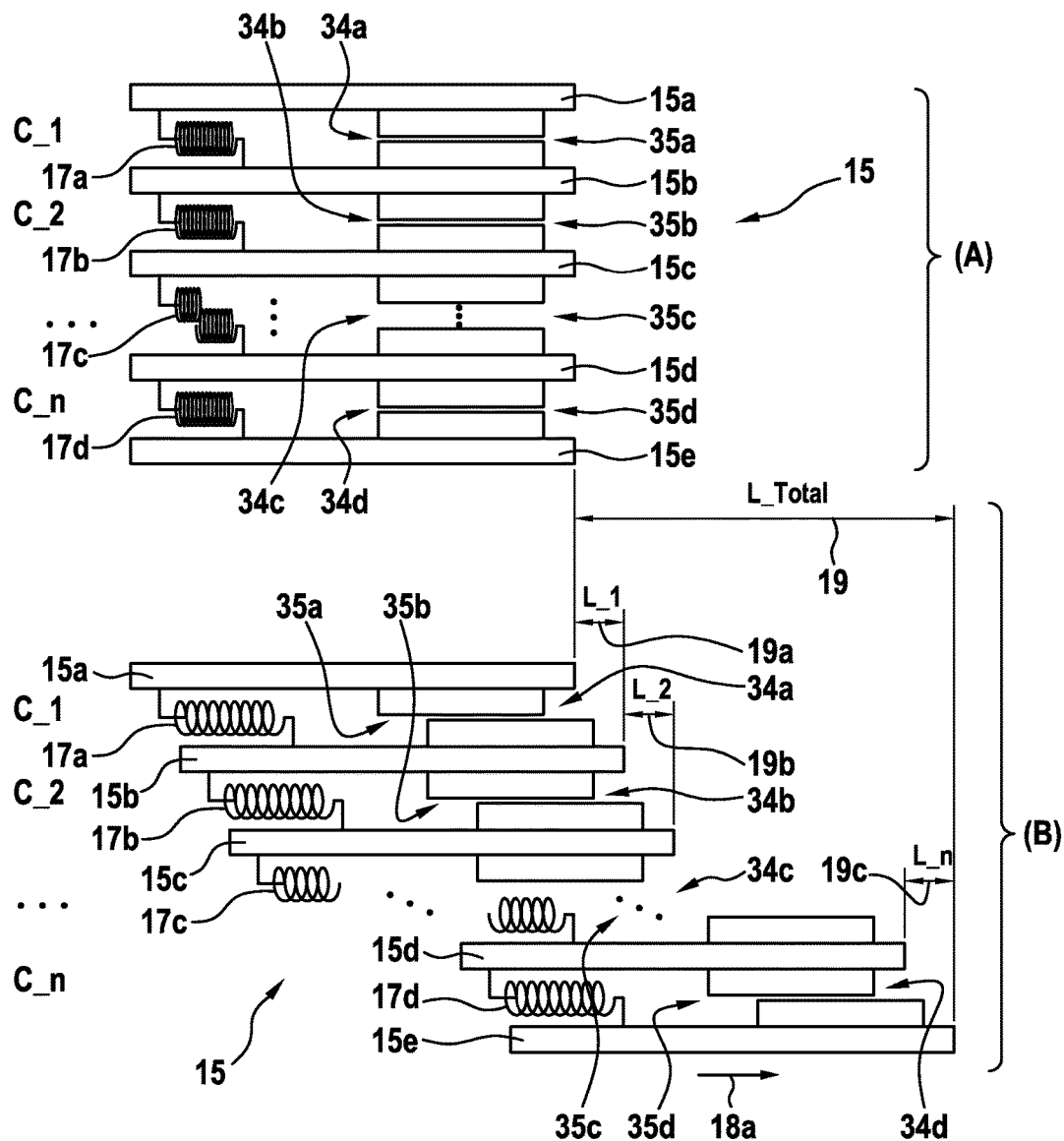
FIG. 5 shows a cross section of a bearing arrangement according to a third embodiment.

FIG. 5 shows a bearing arrangement 15 according to a third embodiment in order to representatively explain the functioning of the serially arranged bearing arrangement according to the invention. The bearing arrangement 15 is illustratively embodied as a translational bearing arrangement and, more specifically, as a planar bearing arrangement that is configured for a limited linear displacement and preferably comprises a multiplicity of planar bearing support elements 15a, 15b, 15c, 15d, 15e that are interconnected by associated planar bearing layers 34a, 34b, 34c, 34d, wherein the planar bearing support elements 15b, 15c, 15d illustratively define intermediate gliding elements.

Each one of the planar bearing layers 34a, 34b, 34c, 34d defines a linear bearing with limited linear displacement and preferably comprises at least one gliding surface 35a, 35b, 35c, 35d, respectively, and at least one flexible connector 17a, 17b, 17c, 17d, respectively. The gliding surfaces 35a, 35b, 35c, 35d are illustratively embodied as plate-shaped, planar gliding surfaces and the flexible connectors 17a, 17b, 17c, 17d are, in contrast to FIG. 1 to FIG. 4, embodied as mechanical springs.

In a section (A) of FIG. 5, the planar bearing arrangement 15 is shown in an unloaded state, in which the mechanical springs 17a, 17b, 17c, 17d are relaxed and the planar bearing support elements 15a, 15b, 15c, 15d, 15e are accordingly positioned in their neutral positions. In a section (B) of FIG. 5, the planar bearing arrangement 15 is shown in a loaded state, in which the mechanical springs 17a, 17b, 17c, 17d are tensed.

In the loaded state, the planar bearing support element 15e is illustratively linearly displaced in a displacement direction 18a with respect to the planar bearing support element 15a with a total linear displacement 19, which is also referred to as $L_{Total}$. This total linear displacement $L_{Total}$ is defined as a sum of all displacement sections 19a, 19b, 19c defining corresponding displacement distances $L_1, L_2, \ldots, L_n$ of the individual planar bearing support elements 15b, 15c, 15d, 15e relative to adjacent planar bearing support elements 15a, 15b, 15c, 15d out of their neutral positions, with n+1 defining a number of provided planar bearing support elements 15a, 15b, 15c, 15d and $n$ defining the number of embodied planar bearing layers 34a, 34b, 34c, 34d.

In the illustrated example, the number of provided planar bearing support elements 15a, 15b, 15c, 15d n+1=5 and the number of provided planar bearing layers 34a, 34b, 34c, 34d is n=4. Furthermore, the displacement section 19a represents a displacement distance $L_1$ between the planar bearing support element 15b and the planar bearing support element 15a, the displacement section 19b represents a displacement distance $L_2$ between the planar bearing support element 15c and the planar bearing support element 15b, and so on.

Dependent on the total linear displacement $L_{Total}$, a total elastic force F of all mechanical springs 17a, 17b, 17c, 17d can be determined. This total elastic force F amounts at the total linear displacement $L_{Total}$ to:

$$F = C_{Total} * L_{Total}$$

This total elastic force F is proportional to a total stiffness $C_{Total}$ of all mechanical springs 17a, 17b, 17c, 17d, where each individual mechanical spring 17a, 17b, 17c, 17d has a stiffness $C_k$ with k=1 . . . n, so that $C_{Total}$ amounts to:

$$C_{Total} = \frac{1}{\frac{1}{C_1} + \frac{1}{C_2} + \ldots + \frac{1}{C_n}}$$

Assuming now that all applied mechanical springs 17a, 17b, 17c, 17d are at least substantially embodied identically, the elastic force of all mechanical springs 17a, 17b, 17c, 17d arranged in series is identical. Thus, a corresponding displacement distance in a given planar bearing layer k amounts to:

$$L_k = \frac{F}{C_k} = L_{Total} * \frac{C_{Total}}{C_k}$$

In other words, in each one of the planar bearing layers 34a, 34b, 34c, 34d, the respective displacement distances $L_1, L_2, \ldots, L_n$ that are set in operation are proportional to the ratio of the total stiffness $C_{Total}$ of all mechanical springs 17a, 17b, 17c, 17d connected in series to the stiffness $C_k$ of each mechanical spring 17a, 17b, 17c, 17d separately.

The total relative velocity $v_{Total}$ of the planar bearing arrangement 15 then divides in proportion to the displacement distances $L_1, L_2, \ldots, L_n$ to each of the planar bearing layers 34a, 34b, 34c, 34d, so that the relative velocity $v_k$ of a given bearing layer k amounts to:

$$v_k = v_{total} * \frac{L_k}{L_{Total}} = v_{Total} * \frac{C_{Total}}{C_k}$$

It should be noted that the maximum elastic force which occurs during operation of the planar bearing arrangement 15 is preferably several times greater than the differences between the frictional resistances of the provided planar bearing layers 34a, 34b, 34c, 34d, so that the relative speed defined by the stiffness of each mechanical spring 17a, 17b, 17c, 17d is at least approximately predefined.

It should further be noted that, for the planar bearing arrangement 15 with the limited linear displacement, but also for cylindrical or spherical bearing arrangements with limited angular amplitude, such as the spherical bearing arrangement 6 of FIG. 1 to FIG. 4, an underlying relative speed may be set indirectly by means of a respective relative displacement. For this purpose, the mechanical springs 17a, 17b, 17c, 17d are inserted between the planar bearing support elements 15a, 15b, 15c, 15d, 15e in each one of the planar bearing layers 34a, 34b, 34c, 34d. They are relaxed in the neutral positions of the planar bearing layers 34a, 34b, 34c, 34d, and they can be tensed by a respective linear displacement. This analogously applies to the spherical bearing arrangement 6 of FIG. 1 to FIG. 4, where the elastomeric springs 11a, 11b, 11c, 11d, 11e, 11f, 11g are inserted into each one of the spherical bearing layers 6a, 6b, 6c, 6d, 6e, 6f, 6g.

Figure 6:
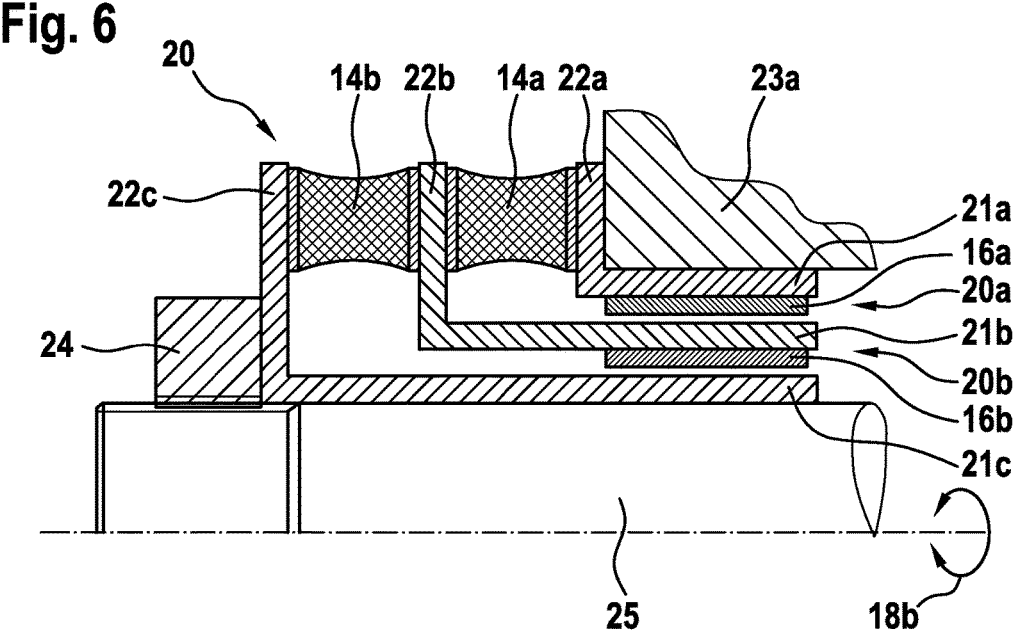
FIG. 6 shows a cross section of a bearing arrangement according to a fourth embodiment.

FIG. 6 shows a bearing arrangement 20 according to a fourth embodiment, which is illustratively embodied as a radial-axial bearing arrangement that is at least essentially configured for a limited angular amplitude. The radial-axial bearing arrangement 20 illustratively comprises a first bearing support element 21a and a second bearing support element 21c. Between these first and second bearing support elements 21a, 21c, two radial bearing layers 20a, 20b are arranged in series. These two serial radial bearing layers 20a, 20b are glidingly interconnected by an intermediate gliding element 21b.

By way of example, the first bearing support element 21a is rigidly attached to a bearing holder 23a, e.g. by a press-fit, gluing or bonding connection, and the second bearing support element 21c is rigidly attached to a shaft 25, e.g. by a press-fit, gluing or bonding connection, and secured on the shaft 25 by means of a nut 24. The shaft 25 is rotatable around an associated rotation axis, as indicated by an arrow 18b, by means of the two serial radial bearing layers 20a, 20b and, thus, displaceable with a given angular amplitude relative to the bearing holder 23a.

Illustratively, a first serial radial bearing layer 20a is arranged between the first bearing support element 21a and the intermediate gliding element 21b, and a second serial radial bearing layer 20b is arranged between the intermediate gliding element 21b and the second bearing support element 21c. The first serial radial bearing layer 20a comprises at least one first gliding surface 16a that is arranged between the first bearing support element 21a and the intermediate gliding element 21b, and that is preferably rigidly attached, e.g. by a press-fit, gluing or bonding connection, to the first bearing support element 21a and spaced by a predefined gap from the intermediate gliding element 21b. The second serial radial bearing layer 20b comprises at least one second gliding surface 16b that is arranged between the intermediate gliding element 21b and the second bearing support element 21c, and that is preferably rigidly attached, e.g. by a press-fit, gluing or bonding connection, to the intermediate gliding element 21b and spaced by a predefined gap from the second bearing support element 21c.

The gliding surfaces 16a, 16b are preferentially formed by PTFE gliding components, so that the first and second serial radial bearing layers 20a, 20b are embodied as self-lubricating bearings. Furthermore, the gliding surfaces 16a, 16b are preferentially provided as annular components so as to form cylindrical bearings.

According to one aspect, the first bearing support element 21a, the intermediate gliding element 21b and the second bearing support element 21c are respectively embodied as a sleeve or hollow cylinder that is provided with an associated collar-shaped flange 22a, 22b, 22c. The collar-shaped flange 22a is preferably elastically attached by means of at least one first flexible connector 14a to the collar-shaped flange 22b, which is preferably further elastically attached by means of at least one second flexible connector 14b to the collar-shaped flange 22c.

Each one of the at least one first and second flexible connectors 14a, 14b preferentially comprises at least one elastomeric spring. Preferably, the at least one first and second flexible connectors 14a, 14b are provided as elastomeric rings which are glued or bonded to the collar-shaped flanges 22a, 22b, 22c, respectively.

Preferably, a given ratio of an underlying spring stiffness of the elastomeric spring 14a to an underlying spring stiffness of the elastomeric spring 14b is equal to a ratio of the diameter of a given tread on the first bearing support element 21a to the diameter of a given tread on the intermediate gliding element 21b. This leads to a uniform distribution of the relative speed between the shaft 25 and the bearing holder 23a on the gliding velocity between the bearing layers 20a, 20b.

It should be noted that the elastomeric springs 14a, 14b permit a linear displacement of the shaft 25 relative to the bearing holder 23a along the rotation axis of the shaft 25. Thus, the elastomeric springs 14a, 14b function, at least to some extent, as translational bearings.

It should further be noted that the functioning of the radial-axial bearing arrangement 20 is similar to the above described functioning of the spherical bearing arrangement 6 of FIG. 1 to FIG. 4 and the translational bearing arrangement 15 of FIG. 5. Therefore, the functioning of the radial-axial bearing arrangement 20 is not described in more detail for brevity and conciseness.

Figure 7:
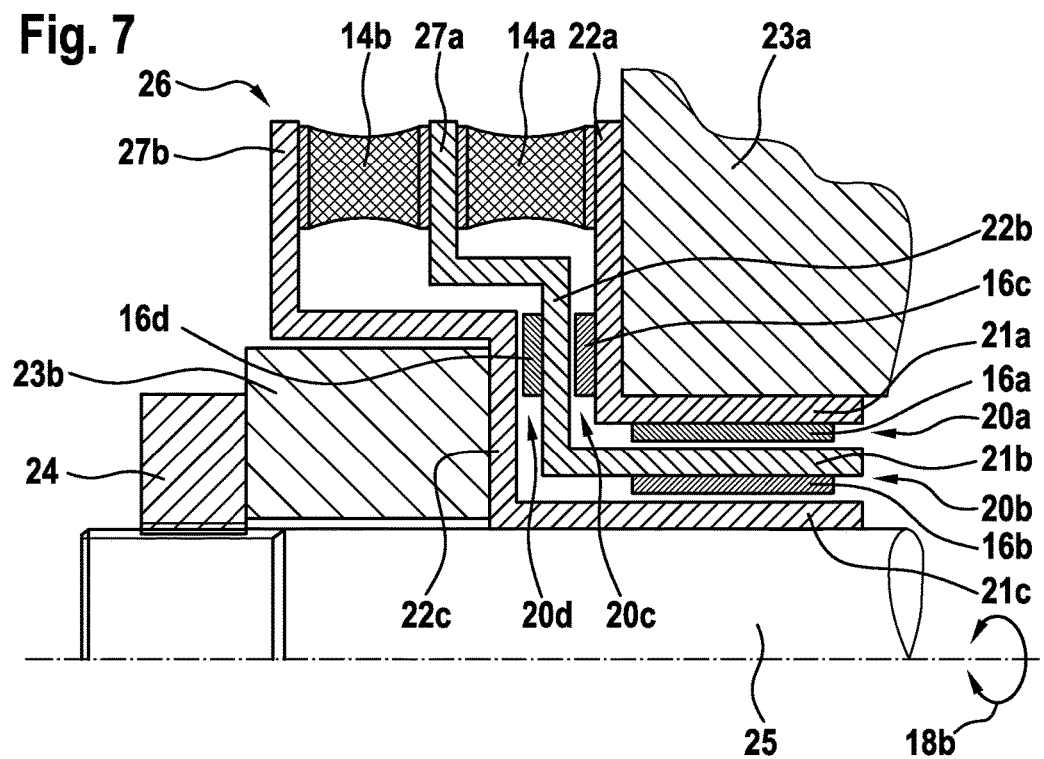
FIG. 7 shows a cross section of a bearing arrangement according to a fifth embodiment.

FIG. 7 shows a bearing arrangement 26 according to a fifth embodiment, which is illustratively embodied as a radial-axial bearing arrangement that is also at least essentially configured for a limited angular amplitude. The radial-axial bearing arrangement 26 is based on the radial-axial bearing arrangement 20 of FIG. 6, so that hereinafter only the differences to this radial-axial bearing arrangement 20 of FIG. 6 are explained in more detail.

In the radial-axial bearing arrangement 26, preferably a first axial bearing layer 20c is arranged between the collar-shaped flange 22a and the collar-shaped flange 22b and a second axial bearing layer 20d is arranged between the collar-shaped flange 22b and the collar-shaped flange 22c. The first and second axial bearing layers 20c, 20d are arranged in parallel to the first and second radial bearing layers 20a, 20b.

More specifically, the first and second axial bearing layers 20c, 20d comprise, respectively, associated gliding surfaces 16c, 16d, which are preferably plate- and ring-shaped and formed by PTFE gliding components. These gliding surfaces 16c, 16d are rigidly attached, e.g. by a press-fit, gluing or bonding connection, to the collar-shaped flange 22a and the collar-shaped flange 22b, respectively. Preferably, the gliding surfaces 16c, 16d are spaced from the collar-shaped flange 22b and the collar-shaped flange 22c, respectively, by an associated gap.

Furthermore, in contrast to FIG. 6, the collar-shaped flange 22a is extended in radial direction and the collar-shaped flanges 22b, 22c are provided with respective L-shaped radial extensions 27a, 27b. The collar-shaped flange 22a is preferably elastically attached in the region of its radial extension by means of the at least one first flexible connector 14a to the L-shaped radial extension 27a, which is preferably further elastically attached by means of the at least one second flexible connector 14b to the L-shaped radial extension 27b. The flexible connectors 14a, 14b are preferably glued or bonded to the collar-shaped flange 22a and the L-shaped radial extensions 27a, 27b, respectively.

It should be noted that the radial extensions 27a, 27b are only L-shaped in cross section by way of example. However, when viewed in perspective, they would be formed as a hollow cylinder with a plate- or collar-shaped end flange. It should further be noted that an optional spacer 23b is illustratively shown between the nut 24 and the second bearing support element 21c, i.e. its collar-shaped flange 22c. This optional spacer 23b enables a more secure fixation of the second bearing support element 21c on the shaft 25, but can also be omitted in order to simplify the overall design.

Figure 8:
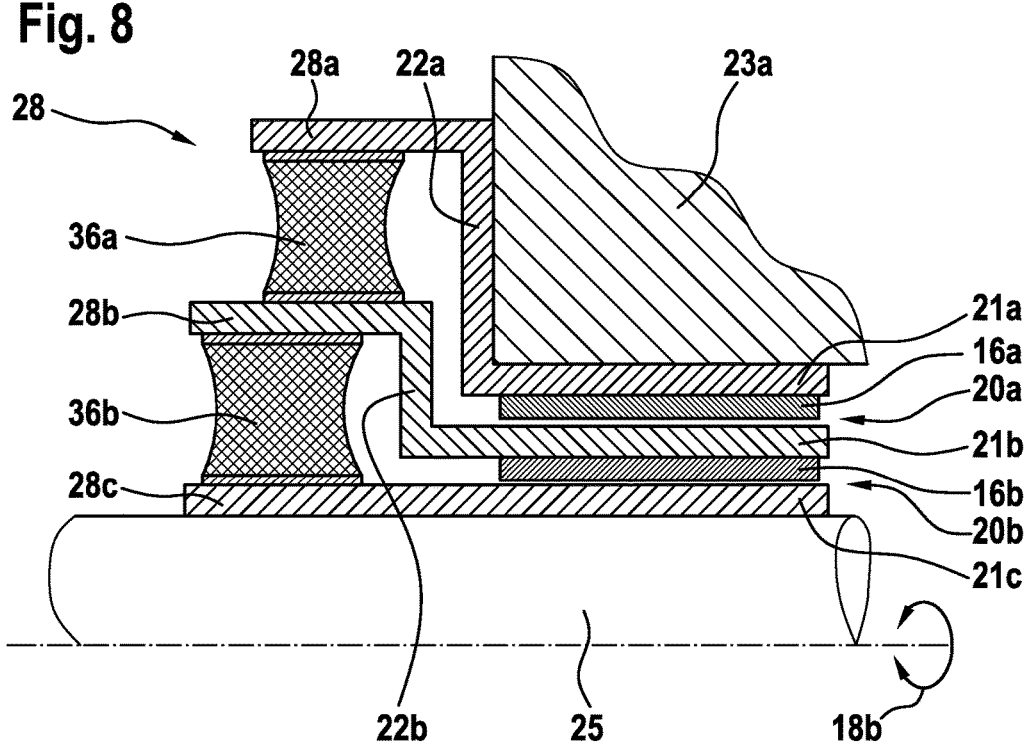
FIG. 8 shows a cross section of a bearing arrangement according to a sixth embodiment.

FIG. 8 shows a bearing arrangement 28 according to a sixth embodiment, which is illustratively embodied as a radial bearing arrangement that is configured for a limited angular amplitude. The radial bearing arrangement 28 is also based on the radial-axial bearing arrangement 20 of FIG. 6, so that hereinafter again only the differences to this radial-axial bearing arrangement 20 of FIG. 6 are explained in more detail.

According to one aspect, the collar-shaped flange 22a is extended in radial direction and provided with an I-shaped axial extension 28a and the collar-shaped flange 22b is provided with an I-shaped axial extension 28b. Furthermore, the collar-shaped flange 22c is removed from the second bearing support element 21c, which now comprises an axial extension 28c.

The I-shaped axial extension 28a is preferably elastically attached by means of the at least one first flexible connector 36a of FIG. 4 to the I-shaped axial extension 28b, which is preferably further elastically attached by means of the at least one second flexible connector 36b of FIG. 4 to the axial extension 28c. The flexible connectors 36a, 36b are preferably glued or bonded to the I-shaped axial extensions 28a, 28b and the axial extension 28c, respectively.

It should be noted that the axial extensions 28a, 28b are only I-shaped in cross section by way of example. However, when viewed in perspective, they would be formed as sleeves.

Furthermore, it should be noted that the nut 24 has been omitted in the radial bearing arrangement 28. Thus, the connection between the second bearing support element 21c and the shaft 25 needs to be reliably secured without the nut 24.

Figure 9:
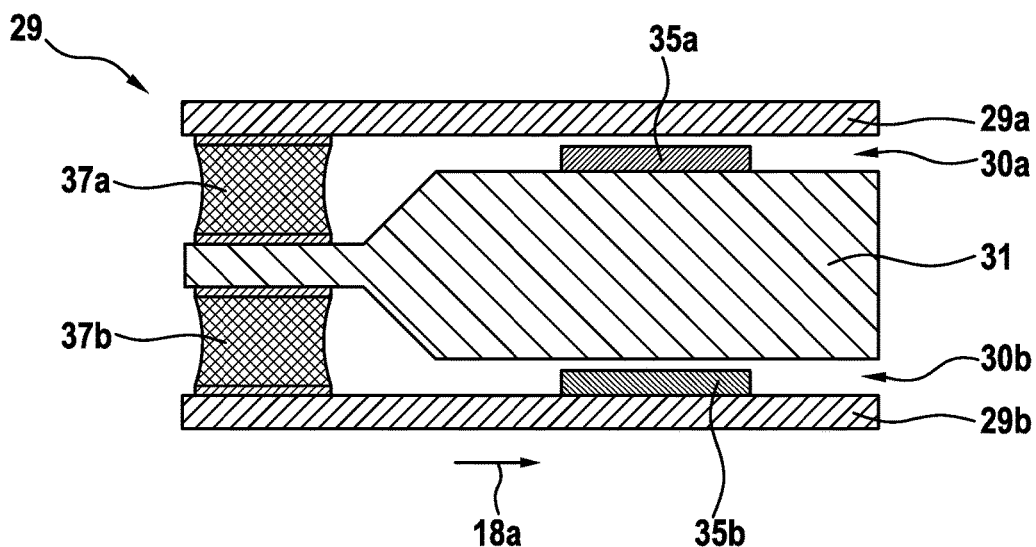
FIG. 9 shows a cross section of a bearing arrangement according to a seventh embodiment.

FIG. 9 shows a bearing arrangement 29 according to a seventh embodiment, which is illustratively embodied as a translational bearing arrangement and, more specifically, as a planar bearing arrangement that is configured for a limited linear displacement. The translational bearing arrangement 29 illustratively comprises two outer gliding plates 29a, 29b and an inner, intermediate gliding element 31.

Between the outer gliding plates 29a, 29b and the intermediate gliding element 31, two planar bearing layers 30a, 30b are provided by way of example. These two planar bearing layers 30a, 30b illustratively comprise two planar gliding surfaces 35a, 35b of FIG. 5, which are preferably embodied as PTFE plates that are attached to the intermediate gliding element 31 and the outer gliding plate 29b, respectively.

The intermediate gliding element 31 is exemplarily spatula-shaped and elastically attached to the outer gliding plates 29a, 29b by means of flexible connectors 37a, 37b, which are preferably embodied as elastomeric springs, in analogy e.g. to the flexible connectors of FIG. 6 to FIG. 8. These flexible connectors 37a, 37b are preferably glued or bonded to the intermediate gliding element 31 and the outer gliding plates 29a, 29b, respectively.

In operation, the outer gliding plate 29a can be displaced linearly with respect to the outer gliding plate 29b, as indicated by the arrow 18a of FIG. 5.

Figure 10:
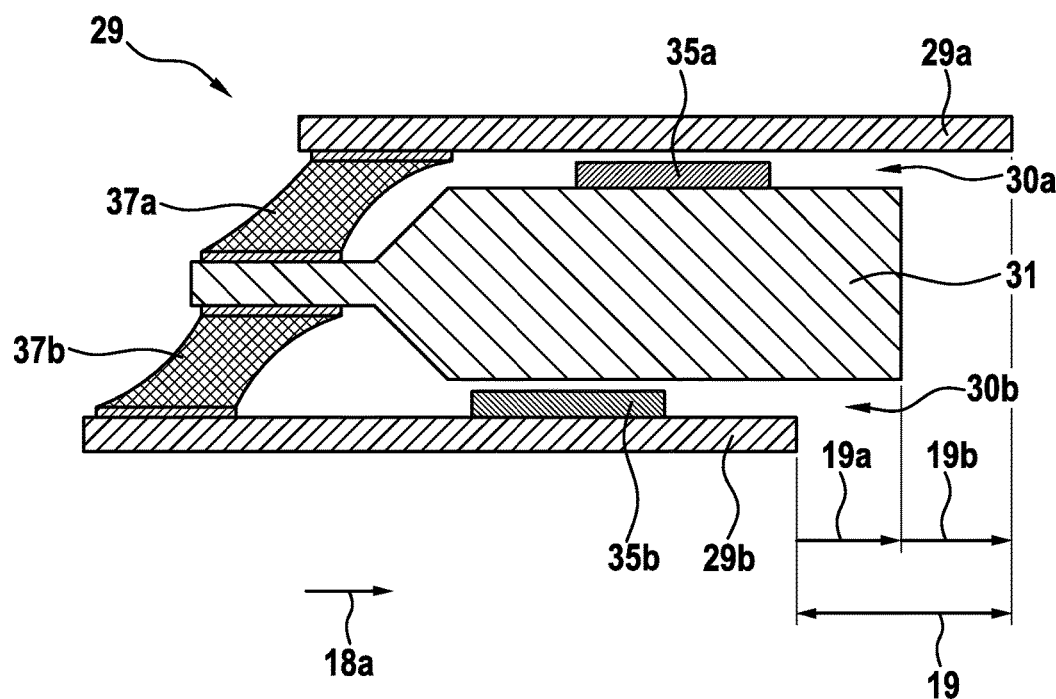
FIG. 10 shows the bearing arrangement of FIG. 9 in operation.

FIG. 10 shows the planar bearing arrangement 29 of FIG. 9 in operation. Illustratively, the outer gliding plate 29a is linearly displaced for the total linear displacement 19 of FIG. 5, which is here by way of example composed only of the displacement sections 19a, 19b associated with each one of the planar bearing layers 30a, 30b.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. For instance, the serial arrangement of individual bearing layers can be applied to multiple different bearing arrangement types, such as rolling bearings, e.g. ball bearings, cylindrical roller bearings or tapered roller bearings, friction bearings, e.g. hydrodynamic, hydrostatic or lifetime lubrication bearings, as well as combinations of different types of bearings.

The serial arrangement of individual bearing layers can also be applied to multiple different bearing arrangement categories or forms, such as thrust bearings, radial-axial bearings, spherical bearings and/or planar bearings. Moreover, a respectively given number of series-arranged bearings can be varied in an application-specific manner. Furthermore, the modes of distribution of relative velocities can be varied in an application-specific manner. For instance, in case the load does not rotate relative to the bearing holder the outermost relative speed can be kept very small and/or in case the load does not rotate relative to the shaft respectively bolt the innermost relative speed can be kept very small. Finally, other types of springs and spring materials can also be used.

REFERENCE LIST 1 multi-blade rotor
2 rotor blades
3 rotor head
4 rotor mast
5 rotor hub
5a rotor hub support element
6 spherical bearing arrangement
6a, 6b, 6c, 6d, 6e, 6f, 6g serial spherical bearing layers
7 coupling sleeve
8a, 8b, 8c, 8d, 8e, 8f, 8g, 8h serial bearings radii
9a, 9b, 9c, 9d, 9e, 9f, 9g first curved gliding surfaces
10a, 10b, 10c, 10d, 10e, 10f, 10g second curved gliding surfaces
11a, 11b, 11c, 11d, 11e, 11f, 11g inner flexible connectors
12a, 12b, 12c, 12d, 12e, 12f spherical bushings
13, 13a, 13h pivot centers
14a, 14b outer flexible connectors
15 planar bearing arrangement
15a, 15b, 15c, 15d, 15e planar support elements
16a, 16b, 16c, 16d sleeve-shaped gliding surfaces
17a, 17b, 17c, 17d spring-type connectors
18a, 18b gliding directions
19 total gliding distance
19a, 19b, 19c gliding distance sections
20 radial-axial bearing arrangement
20a, 20b serial radial bearing layers 20c, 20d serial axial bearing layers
21a, 21c bearing support element
21b intermediate gliding element
22a, 22b, 22c support element flanges
23a bearing holder
23b spacer
24 nut
25 shaft
26 radial-axial bearing arrangement
27a, 27b L-shaped radial extensions
28 radial bearing arrangement
28a, 28b I-shaped axial extensions
28c axial extension
29 planar bearing arrangement
29a, 29b gliding plates
30a, 30b serial axial bearing layers
31 intermediate gliding element
32a, 32b, 32c gaps
33a, 33b, 33c, 33d shoulders
34a, 34b, 34c, 34d planar bearing layers
35a, 35b, 35c, 35d planar gliding surfaces
36a, 36b, 36c, 36d, 36e, 36f, 37a, 37b flexible connectors

What is claimed is:

1. A bearing arrangement comprising:
a first bearing layer comprising a first bearing support element and a second bearing layer comprising a second bearing support element, the first and second bearing layers being glidingly interconnected by an intermediate glide element,
a first gliding component arranged between the first bearing support element and the intermediate glide element; and
a second gliding component arranged between the second bearing support element and the intermediate glide element, the intermediate glide element being elastically attached to the first bearing support element by a first flexible connector and to the second bearing support element by a second flexible connector,
wherein the first flexible connector and the second flexible connector are physically separated from each other by the intermediate glide element to maintain relative movement between the first and second bearing support elements.

2. The bearing arrangement according to claim 1, wherein at least one of the first flexible connector or the second flexible connector comprise at least one of an elastomeric spring or a mechanical spring.

3. The bearing arrangement according to claim 1, wherein at least one of the first flexible connector and the second flexible connector are relaxed in an unloaded state of the first and second bearing layers.

4. The bearing arrangement according to claim 1, wherein at least one of the first and second flexible connectors are at least substantially designed for carrying shear loads.

5. The bearing arrangement according to claim 1, wherein at least one of the first and second bearing layers define one of a cylindrical bearing or a spherical bearing having limited angular amplitude.

6. The bearing arrangement according to claim 5, wherein at least one of the first and second flexible connectors generate a restoring force when the first and second bearing layers are in a loaded state, the restoring force comprising a magnitude that increases with a current angular amplitude associated with a corresponding one of the first and second bearing layers.

7. The bearing arrangement according to claim 5, wherein at least one of the first and second bearing support elements and the intermediate glide element define shell-type bushings.

8. The bearing arrangement according to claim 1, wherein at least one of the first and second bearing layers define linear bearings with limited linear displacement.

9. The bearing arrangement according to claim 8, wherein at least one of the first and second flexible connectors generate a restoring force when the first and second bearing layers are in a loaded state, the restoring force comprising a magnitude that increases with a current linear displacement associated with a corresponding one of the first and second bearing layers.

10. The bearing arrangement according to claim 1, wherein at least one of the first gliding component and the second gliding component is formed of polytetrafluoroethylene.

11. A multi-blade rotor comprising:
a multiplicity of rotor blades;
a rotor head with an associated rotor hub,
a bearing arrangement connecting at least one of the multiplicity of rotor blades with the rotor hub, the bearing arrangement having:
a first bearing layer comprising a first bearing support element and a second bearing layer comprising a second bearing support element, the first and second bearing layers being glidingly interconnected by at least one intermediate glide element,
wherein a first gliding component is arranged between the first bearing support element and the intermediate glide element, and
wherein a second gliding component is arranged between the second bearing support element and the intermediate glide element, the intermediate glide element being elastically attached to the first bearing support element by a first flexible connector and to the second bearing support element by a second flexible connector, and
wherein the first flexible connector and the second flexible connector are physically separated from each other by the at least one intermediate glide element to maintain relative movement between the first and second bearing support elements.

12. The multi-blade rotor according to claim 11, wherein at least one of the first flexible connector or the second flexible connector comprise at least one of an elastomeric spring or a mechanical spring.

13. The multi-blade rotor according to claim 11, wherein at least one of the first flexible connector and second flexible connector are relaxed in an unloaded state of the first and second bearing layers.

14. The multi-blade rotor according to claim 11, wherein at least one of the first and second flexible connectors are at least substantially designed for carrying shear loads.

15. The multi-blade rotor according to claim 11, wherein at least one of the first and second bearing layers define one of a cylindrical bearing or a spherical bearing having limited angular amplitude.

16. The multi-blade rotor according to claim 15, wherein at least one of the first and second flexible connectors generate a restoring force when the first and second bearing layers are in a loaded state, the restoring force comprising a magnitude that increases with a current angular amplitude associated with a corresponding one of the first and second bearing layers.

17. The multi-blade rotor according to claim 15, wherein at least one of the first and second bearing support elements and the intermediate glide element define shell-type bushings.

18. The multi-blade rotor according to claim 11, wherein the rotor hub forms the first bearing support element and at least one of the multiplicity of rotor blades comprises a coupling sleeve that forms the second bearing support element.

19. The multi-blade rotor according to claim 11, wherein at least one of the first gliding component and the second gliding component is formed of polytetrafluoroethylene.

20. A bearing arrangement comprising:
a first bearing layer comprising a first bearing support element;
a second bearing layer comprising a second bearing support element;
an intermediate glide element disposed between the first and second bearing layers;
a first gliding component arranged between the first bearing support element and the intermediate glide element, and
a second gliding component arranged between second bearing support member and the intermediate glide element;
a first flexible connector elastically attached to the first bearing support element and the intermediate glide element; and
a second flexible connector elastically attached to the second bearing support element and the intermediate glide element,
wherein the first flexible connector and the second flexible connector are physically separated from each other by the intermediate glide element to maintain relative movement between the first and second bearing support elements.

* * * * *